(No Model.)
G. B. PATTISON.
WINDOW VENTILATOR.
No. 584,890. Patented June 22, 1897.
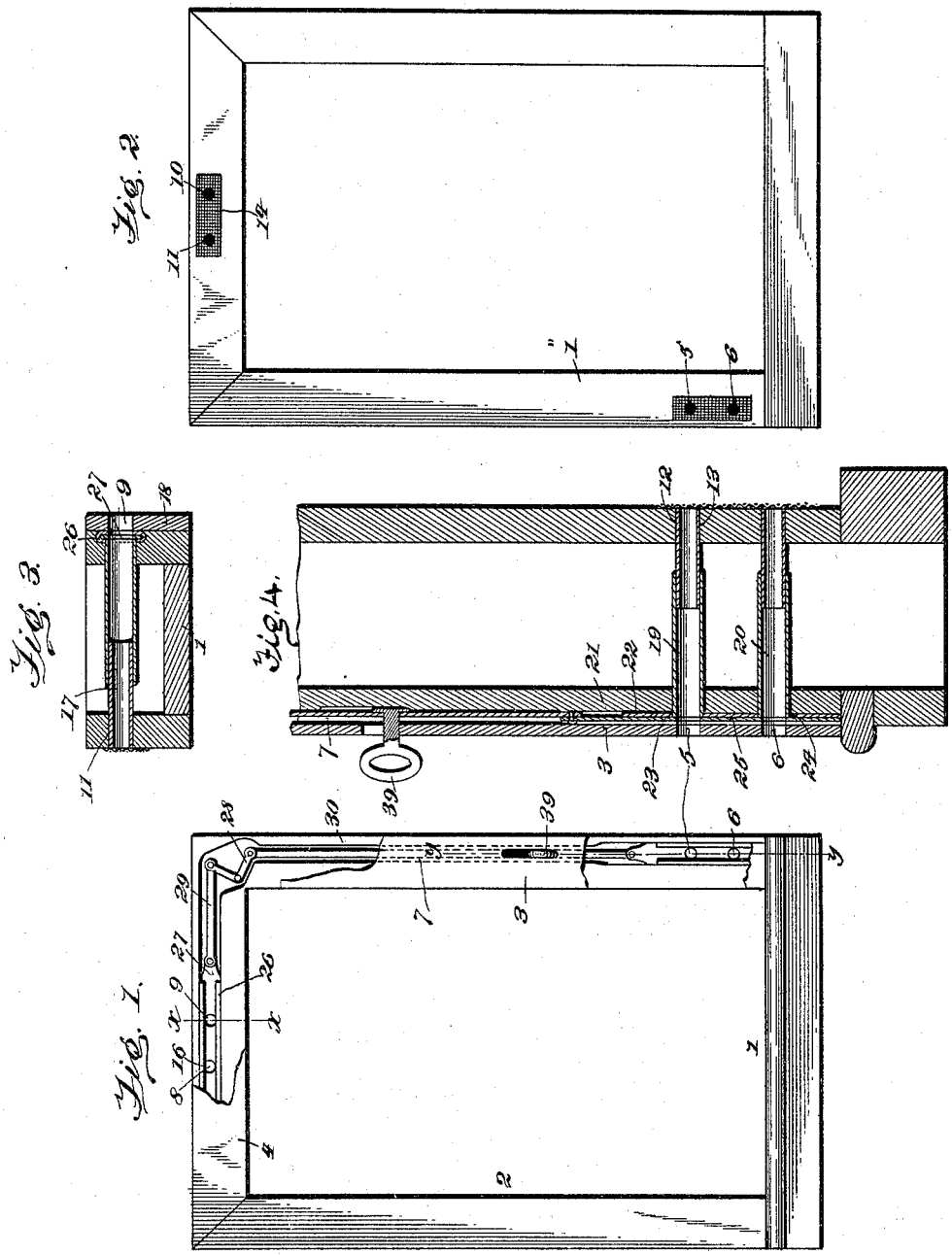
WITNESSES
INVENTOR
George B. Pattison,
by John Wedderburn
Attorney

UNITED STATES PATENT OFFICE.

GEORGE B. PATTISON, OF ROSE'S VALLEY, PENNSYLVANIA.

WINDOW-VENTILATOR.

SPECIFICATION forming part of Letters Patent No. 584,890, dated June 22, 1897.

Application filed September 4, 1896. Serial No. 604,873. (No model.)

*To all whom it may concern:*

Be it known that I, GEORGE B. PATTISON, a citizen of the United States, residing at Rose's Valley, in the county of Lycoming and State of Pennsylvania, have invented certain new and useful Improvements in Window-Ventilators; and I do hereby declare the following to be a full, clear, and exact description of the invention, such as will enable others skilled in the art to which it appertains to make and use the same.

My invention relates to window-ventilators.

My object is to provide an extremely simple and cheap ventilator of the class described which will be adaptable to any window-casing and can be quickly and easily manipulated, so as to allow the vitiated air to pass out and fresh air to enter the apartment, and will at the same time prevent the entrance of any insects or foreign material.

Having this object in view, my invention consists of a novel form of ventilator, as will appear more fully hereinafter.

In the accompanying drawings, Figure 1 is a view of a window frame or casing partly broken away and equipped with my improved ventilator; Fig. 2, a front view of the same; Fig. 3, a section on the line $x$ $x$ of Fig. 1, and Fig. 4 a section on the line $y$ $y$ of Fig. 1.

The numeral 1 designates an ordinary window-casing, which is provided with side strips or beads 2 and 3 and a top beading 4. Near the bottom of the beading 3 are located two circular holes 5 and 6, which are arranged in vertical alinement.

The numeral 7 designates a vertical guide-slot located about midway of the height of the bead 3. In the upper bead 4 there are also located two circular openings 8 and 9. Two additional holes 10 and 11 are made through the upper cross-strip of the upper portion of the frame, and these holes are in alinement with the holes 8 and 9. At the lower portion of the upper side strip of the window-frame are located two apertures 12 and 13, which are in alinement with openings 5 and 6.

The numeral 14 designates pieces of netting which cover the holes 10 and 11, and a similar piece of netting is employed to cover the apertures 12 and 13. These pieces of netting prevent any insects or foreign material from entering the apartment.

The numerals 16 and 17 designate pipes made in telescoping sections, which are received in the openings 10 and 11 and project through the front of the top portion 18 of the window-frame, so that they will be in alinement with openings 8 and 9.

The numerals 19 and 20 designate similar pipes which have their ends received in openings 12 and 13 and project through the inner side piece 21 of the window-frame in alinement with openings 5 and 6. The pipes are made telescoping, so that they can be adapted to window-casings of any thickness.

The numeral 22 designates a guide-plate provided with rebent lips and which is sunk in the side piece 21 and is provided with apertures 23 and 24 in alinement with pipes 19 and 20.

The numeral 25 designates a slide which is provided with openings adapted to register with those in the guide-plate. A similar guide-plate 26 and slide 27 are employed at the top of the window-frame.

At 28 is shown a bell-crank lever, and the numerals 29 and 30 designate pull-bars which connect the arms of said lever with the respective ventilating-slides. Any preferred form of detachable connection can be used for fastening these pull-bars to the slide. At 39 is shown a thumb-knob which is adapted for movement in slot 7. Whenever it is desirable to ventilate the apartment, the thumb-knob is pulled down, whereupon the openings in the slides will come into register with the openings in the guide-plates and the bad air will be drawn off through the lower ventilator and the pure air will come in through the upper ventilator. The knob can be raised or lowered to any desired extent, so that any amount of ventilation can be obtained.

Many slight changes might be resorted to in constructing my improved ventilator without detracting from any of its advantages, and hence it is to be understood that I consider myself entitled to all such varied constructions as properly come within the spirit and scope of the invention.

Having thus described my invention, what

I claim as new, and desire to secure by Letters Patent, is—

1. The combination with a window frame or casing, of an upper ventilator, a lower ventilator, a pivoted bell-crank lever, a pull-bar connecting one ventilator with one arm of the lever, a second pull-bar connecting the other ventilator with the other arm of the lever, and a thumb-knob connected to one of the pull-bars, whereby the two ventilators may be simultaneously operated.

2. The combination with a window frame or casing, of a guide-plate provided with an opening and located in the upper part of the casing, a ventilating-slide having an opening movable in relation to the guide-plate, a similar ventilating arrangement located in the lower portion of the frame or casing, a pivoted bell-crank lever, pull-bars connecting the arms of the bell-crank lever with the ventilating-slides, and means for moving one of said pull-bars.

3. The combination with a window frame or casing, of upper and lower ventilating-tubes passing therethrough, wire-netting covering the mouths of said tubes, perforated ventilating-slides movable across the inner ends of said ventilating-tubes, a pivoted bell-crank lever, pull-bars connecting the slides with the arms and the bell-crank lever, and a thumb-knob connected to one of said pull-bars.

In testimony whereof I have signed this specification in the presence of two subscribing witnesses.

GEORGE B. PATTISON.

Witnesses:
  JACOB STROBLE,
  GEORGE SWINEHART.